UNITED STATES PATENT OFFICE.

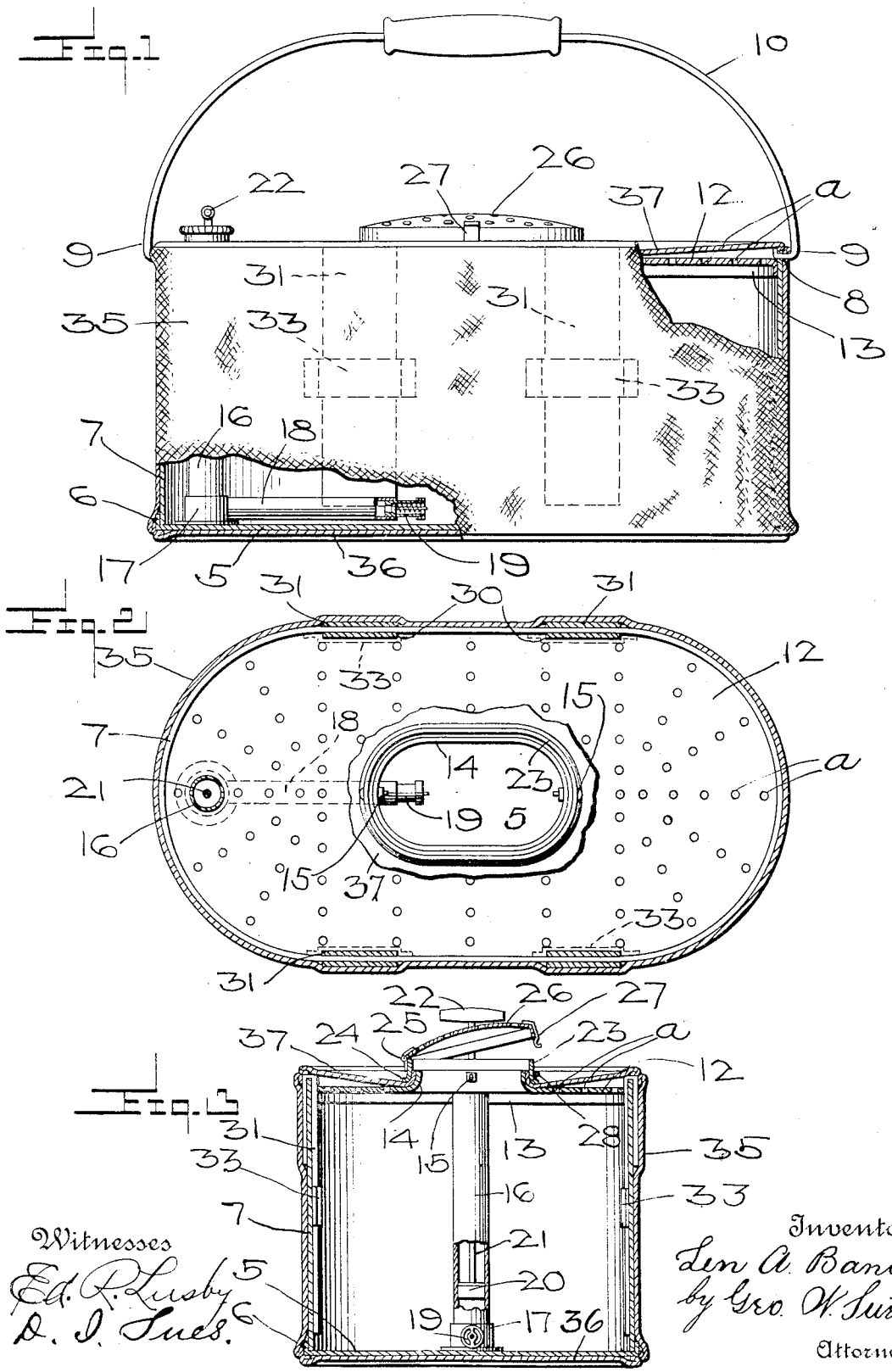

LEN A. BANTA, OF LIGONIER, INDIANA.

MINNOW-PAIL.

1,039,633.

Specification of Letters Patent.  Patented Sept. 24, 1912.

Application filed August 20, 1909. Serial No. 513,784.

*To all whom it may concern:*

Be it known that I, LEN A. BANTA, a citizen of the United States, and a resident of Ligonier, in the county of Noble and State of Indiana, have invented certain new and useful Improvements in Minnow-Pails.

This invention relates to minnow pails.

The object of my invention is, to provide a bait bucket in which live minnows may be kept in a healthy, lively condition.

With the above and other objects in view, the present invention consists in the combination and arrangement of parts, as will be described more fully hereinafter and particularly pointed out in the accompanying claims, it being understood that changes in the specific structure shown and described, may be made within the scope of the claims, without departing from the spirit of my invention.

In the drawings forming a part of these specifications and in which like numerals of reference refer to similar parts in the several views: Figure 1, shows an elevational view with portions broken away of a minnow pail embodying my invention. Fig. 2, shows a fragmentary top view with portions broken away. Fig. 3, shows a transverse sectional view.

Fishermen when angling for certain kinds of fish, find it extremely difficult to keep the minnows, used as bait, alive, where the same are confined in portable bait buckets. This is owing to the fact that the minnows are usually kept in comparatively small vessels, and soon consume the life giving oxygen. In my present invention, I provide a light, neat, and simply constructed minnow pail, so arranged that the water can be aerified, the infusion of air into the water vitalizing the same, so that the minnows are humanely confined and kept alive and active.

An operative embodiment of my invention, includes a receptacle comprising the preferably oblong bottom 5, having the outwardly directed circumscribing flange 6. Securely soldered or otherwise held to this flange 6, is the pail or bucket body 7. Near the upper edge and at opposite points, this body is provided with the bail openings 8, arranged to receive the hooked ends 9 of the bail 10.

Secured to the body 7, a suitable distance below the upper edge of the bucket, is the perforated top 12, held parallel to the bottom 5, having the downwardly directed securing flange 13, by means of which the top is secured to the body as shown in Fig. 1. At *a*, I have indicated the perforations in the top. Centrally this top has on oval opening, skirted by the upwardly directed flange 14, which has two apertures to receive the securing bolts 15, held by means of suitable nuts. Near one end, the top 12, is provided with an opening within which is held the pump body 16, comprising an ordinary air pump, having the collar 17 at the lower end, from which extends the tube 18, having the valve 19, at its end. A piston 20, is held within the pump body 16, carrying the plunger 21, from which extends the handle 22. The lower end of the pump is secured to the bottom 5 of the vessel.

Secured to the upstanding flange 14, is the collar 23, the lower end 24 of which is flared outwardly, and is apertured, to receive the bolts 15. Held to the collar 23, is the hinge 25, carrying the perforated lid 26, having the spring catch 27, arranged to snap over the pin 28.

At two oppositely positioned points, the top 12, is slotted, as shown at 30, and passing through these slots are the flat wicks 31, which are bent over the upper edge of the pail body 7, and continued downwardly a suitable distance upon the outside. These wicks upon the inside are held within the metal strap ears 33.

Securely held to the vessel body 7, by stitching or otherwise, is the fabric covering 35, while extending from the upper edge of the body covering 35, is the fabric top section 37, which has a central opening, so that the inner edge of this top section 37, can be securely fastened between the flanges 14 and 24. As shown, the top 12, is positioned a certain distance below the upper edge of the body section 7, so that the canvas or other fabric 37, is obliquely held to the perforated top 12. This construction then provides an air space between the fabric 37, and the upper surface of the member 12.

The bottom 5, is covered by the fabric section 36, stitched to the section 35.

From the foregoing it will be seen, that the entire surface excepting the collar 23, and the perforated lid 26, are covered by the fabric sections, 35, 36, and 37.

In the use of the pail the fabric covering is moistened and when exposed to the air dries. The evaporation causes the absorption of heat, and a consequent cooling of the pail surface, and incidentally of the contents of the pail. The four wicks are of such a capacity that they supply the moisture to the fabric sections in quantities insuring the fabric section being kept thoroughly moist. It is of course understood that the wicks by capillary action draw up the water, which then again by capillary action, spreads over the entire fabric covering.

These minnow pails are made of different sizes, and the water within the same can at any time be vitalized in simply bringing into action the plunger of the air pump.

A minnow pail constructed according to my invention is both durable and positive in its operation.

Having thus described my said invention what I claim as new and desire to secure by United States Letters Patent is:—

1. A minnow pail comprising a vessel having a perforated top with a central opening skirted by an upstanding flange, a fabric covering said vessel, and wicks extending from said vessel and contacting with said fabric.

2. A minnow pail comprising a vessel having a perforated top, with a central opening skirted by an upstanding flange, a fabric covering said vessel, wicks extending from said vessel, and contacting with said fabric, and a lid carried by said flange.

3. A minnow pail having in combination, a perforated top having a centrally positioned opening skirted by an upstanding flange, a collar carried by said flange, said perforated top being positioned below the upper edge of said vessel, a fabric covering said vessel and held between said flange and collar, a plurality of wicks protruding from said vessel and contacting with said fabric, and an air pump projected from the bottom of said vessel with means to operate the same.

In testimony whereof I affix my signature, in presence of two witnesses.

LEN A. BANTA.

Witnesses:
W. H. BENDER,
EMMA A. WORES.